(12) United States Patent
Gao et al.

(10) Patent No.: US 12,147,269 B2
(45) Date of Patent: Nov. 19, 2024

(54) BACK FILM AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Yang Gao, Beijing (CN); Liqiang Chen, Beijing (CN); Jiafan Shi, Beijing (CN); Ziqi Song, Beijing (CN); Zeliang Li, Beijing (CN); Zhendong Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 154 days.

(21) Appl. No.: 17/761,678

(22) PCT Filed: May 25, 2021

(86) PCT No.: PCT/CN2021/095826
§ 371 (c)(1),
(2) Date: Mar. 18, 2022

(87) PCT Pub. No.: WO2021/249183
PCT Pub. Date: Dec. 16, 2021

(65) Prior Publication Data
US 2022/0308625 A1      Sep. 29, 2022

(30) Foreign Application Priority Data

Jun. 9, 2020   (CN) ......................... 202010526349.4

(51) Int. Cl.
*G06F 1/16*      (2006.01)
*G09F 9/30*      (2006.01)

(52) U.S. Cl.
CPC ............ *G06F 1/1652* (2013.01); *G09F 9/301* (2013.01)

(58) Field of Classification Search
CPC .... G06F 1/1601; G06F 1/1637; G06F 1/1652; G09F 9/30
See application file for complete search history.

(56) References Cited

U.S. PATENT DOCUMENTS

| | | |
|---|---|---|
| 9,894,755 B2 | 2/2018 | Kim et al. |
| 10,206,276 B2 | 2/2019 | Kim et al. |

(Continued)

FOREIGN PATENT DOCUMENTS

| | | | |
|---|---|---|---|
| CN | 108766242 A | 11/2018 | |
| CN | 108766977 A * | 11/2018 | ............. G09F 9/301 |

(Continued)

OTHER PUBLICATIONS

International Search Report issued Sep. 24, 2021 in International Application No. PCT/CN2021/095826, 6 pages.

(Continued)

*Primary Examiner* — Nidhi Thaker
(74) *Attorney, Agent, or Firm* — XSENSUS LLP (57) ABSTRACT

A back film and a display device are provided. The back film comprises: a central area, having a first edge and a second edge adjacent to the first edge, wherein the first edge extends in a first direction, the second edge extends in a second direction, and the first direction intersects with the second direction; a first foldable area, connected to the first edge of the central area and extending in the first direction; a second foldable area, connected to the second edge of the central area and extending in the second direction; and a third foldable area, connected to a junction between the first edge and the second edge of the central area, and connected further to the first foldable area and the second foldable area.

(Continued)

The third foldable area is provided with a plurality of openings.

10 Claims, 8 Drawing Sheets

(56) References Cited

U.S. PATENT DOCUMENTS

| | | | |
|---|---|---|---|
| 11,094,895 B2 * | 8/2021 | Dai | H10K 59/179 |
| 2016/0374191 A1 | 12/2016 | Kim et al. | |
| 2018/0139838 A1 | 5/2018 | Kim et al. | |
| 2019/0081127 A1 * | 3/2019 | Shim | H10K 77/111 |
| 2019/0269011 A1 * | 8/2019 | Lee | H05K 3/0014 |
| 2020/0176696 A1 | 6/2020 | Dai | |
| 2020/0335711 A1 | 10/2020 | Zhang et al. | |
| 2022/0102462 A1 * | 3/2022 | Zhou | H10K 71/00 |

FOREIGN PATENT DOCUMENTS

| | | | | |
|---|---|---|---|---|
| CN | 109377877 A | | 2/2019 | |
| CN | 111028682 A | | 4/2020 | |
| CN | 111179777 A | * | 5/2020 | ............ G09F 9/301 |
| CN | 111540279 A | | 8/2020 | |
| CN | 111681547 A | | 9/2020 | |
| CN | 111710245 A | * | 9/2020 | ........... G06F 1/1637 |
| CN | 212010180 U | | 11/2020 | |
| CN | 111028682 B | | 3/2021 | |
| WO | 2020/062339 A1 | | 4/2020 | |

OTHER PUBLICATIONS

Written Opinion of the International Searching Authority issued Sep. 24, 2021 in International Application No. PCT/CN2021/095826, 4 pages.

* cited by examiner

BACK FILM AND DISPLAY DEVICE

CROSS REFERENCE TO RELATED APPLICATION(S)

The present application is a 35 U.S.C. § 371 national phase application of International Application No. PCT/CN2021/095826 filed on May 25, 2021, which claims the benefit of and priority to Chinese Patent Application No. 202010526349.4, filed on Jun. 9, 2020 and entitled as "Back Film and Display Device," the contents of both of which being incorporated by reference in their entireties herein.

TECHNICAL FIELD

The present disclosure relates to the field of display technology, and in particular, to a back film and a display device.

BACKGROUND

With the development of the display industry, more and more display devices use curved display panels to increase the screen ratio and bring users a better visual experience.

Usually, a layer of back film is attached onto the back side of the curved display panel to protect the panel. Ideally, the back film should also have good foldability at the folding area of the curved display panel, so as to form a tight fit with the display panel. However, the back film is usually a whole piece of organic film. The whole piece of organic film has poor ductility and weak folding resistance, which leads to a phenomenon where stress concentration occurs in the folding area of the curved display panel. This results in wrinkles causing it impossible to be tightly attached, or results in damages to the back film, thereby reducing the service life.

It should be noted that the information disclosed in the above Background section is only for an enhanced understanding of the background of the present disclosure, and therefore may contain information that does not constitute the relevant art that is already known to a person of ordinary skills in the art.

SUMMARY

The purpose of the present disclosure is to overcome the above-mentioned deficiencies of the relevant art, and to provide a back film and a display device.

According to an aspect of the present disclosure, there is provided a back film for a curved display panel. The back film includes a central area, a first foldable area, a second foldable area, and a third foldable area.

The central area has a first edge and a second edge adjacent to each other.

The first edge extends in a first direction. The second edge extends in a second direction. The first direction and the second direction intersect with each other.

The first foldable area is connected to the first edge of the central area and extends in the first direction.

The second foldable area is connected to the second edge of the central area and extends in the second direction.

The third foldable area is connected to a junction between the first edge and the second edge of the central area, and further connected to the first foldable area and the second foldable area.

The third foldable area is provided with a plurality of openings.

In an exemplary embodiment of the present disclosure, the first edge and the second edge are perpendicular to each other. The first foldable area and the second foldable area are both rectangular in shape. The extension length of the first foldable area in the first direction is equal to the length of the first edge of the central area. The extension length of the second foldable area in the second direction is equal to the length of the second edge of the central area.

The third foldable area includes a first straight edge connected to the first foldable area, a second straight edge connected to the second foldable area, and an arc-shaped edge connected to the first straight edge and the second straight edge. The length of the first straight edge is equal to the width of the first foldable area in the second direction. The length of the second straight edge is equal to the width of the second foldable area in the first direction.

In an exemplary embodiment of the present disclosure, the lengths of the first straight edge and the second straight edge are equal, and the third foldable area is in a fan shape.

In an exemplary embodiment of the present disclosure, each opening of the third foldable area is in a circle shape.

In an exemplary embodiment of the present disclosure, the diameter of each circular opening is 3-10 μm, and the distance between two adjacent circular openings is 10-15 μm.

In an exemplary embodiment of the present disclosure, each opening of the third foldable area is arc-shaped. The extension direction of each arc-shaped opening is the same as the extension direction of the arc-shaped edge of the third foldable area. A first end of each arc-shaped opening extends to the first straight edge, and a second end of each arc-shaped opening extends to the second straight edge. The arc-shaped openings are arranged at intervals in a direction from a corner of the central area to the arc-shaped edge.

In an exemplary embodiment of the present disclosure, the width of each arc-shaped opening is 80-120 μm, and the distance between two adjacent arc-shaped openings is 150-250 μm.

In an exemplary embodiment of the present disclosure, each opening of the third foldable area is in a strip shape. Each strip opening extends in a direction from a corner of the central area to the arc-shaped edge. A first end of each strip opening extends to a corner of the central area, and a second end of each strip opening extends to the arc-shaped edge. The strip openings are arranged at intervals in a direction from the first straight edge to the second straight edge.

In an exemplary embodiment of the present disclosure, each strip opening is straight, curved or folded.

In an exemplary embodiment of the present disclosure, the closer to the corner of the central area, the smaller the distance between two adjacent strip openings.

In an exemplary embodiment of the present disclosure, the width of each strip opening is 80-120 μm, and the distance between two adjacent strip openings is 150-250 μm.

In an exemplary embodiment of the present disclosure, the spacing between adjacent openings in the third foldable area gradually decreases in a direction towards the central area.

In an exemplary embodiment of the present disclosure, the central area is in a rectangle shape, the number of the third foldable areas is four, and the third foldable areas are respectively located at four corners of the central area.

In an exemplary embodiment of the present disclosure, the first foldable area and the second foldable area are each provided with a plurality of openings.

In an exemplary embodiment of the present disclosure, each opening of the first foldable area and the second foldable area is in a circle or strip shape.

In an exemplary embodiment of the present disclosure, shape and distribution of the openings in the first foldable area are the same as or different from shape and distribution of the openings in the second foldable area, and shapes and distributions of the openings in the first foldable area and the second foldable area are the same as or different from shape and distribution of the openings in the third foldable area.

In an exemplary embodiment of the present disclosure, each opening of the third foldable area is a through hole penetrating through the back film or a blind hole not penetrating through the back film.

In an exemplary embodiment of the present disclosure, the back film is a single-layer film or a multi-layer film.

According to another aspect of the present disclosure, there is provided a display device, comprising a curved display panel and the above-mentioned back film.

The curved display panel has a central area, a first curved area and a second curved area respectively located on two adjacent sides of the central area, and a transition area located at a corner of the central area and connected to the first curved area and the second surface area.

The back film is disposed on a back side of the curved display panel. The central area of the back film covers the central area of the curved display panel. The first foldable area of the back film covers the first curved area of the curved display panel. The second foldable area of the back film covers the second curved area of the curved display panel. The third foldable area of the back film covers the transition area of the curved display panel.

In an exemplary embodiment of the present disclosure, the central area of the curved display panel is in a rectangle shape, the number of the transition areas is four, and the transition areas are respectively located at four corners of the central area of the curved display panel. The central area of the back film is in a rectangle shape, the number of the third foldable areas is four, and the third foldable areas are respectively located at four corners of the central area of the back film.

Each of the four third foldable areas of the back film covers a respective one of the four transition areas of the curved display panel.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the present specification, illustrate embodiments consistent with the present disclosure and together with the description serve to explain the principle of the present disclosure. Understandably, the drawings in the following description are only representative of some embodiments of the present disclosure, and for those of ordinary skill in the art, other drawings may also be obtained from these drawings without creative effort.

In the figures.

10, first foldable area; 20, second foldable area; 30, third foldable area; 31, first straight edge; 32, second straight edge; 33, arc-shaped edge; 40, central area; 41, first edge; 42, second edge; 90, opening; 100, first curved area; 200, second curved area; 300, transition area; 400, central area.

DETAILED DESCRIPTION OF THE EMBODIMENTS

Example embodiments will now be described more fully with reference to the accompanying drawings. Example embodiments, however, may be embodied in various forms and should not be construed as limited to embodiments set forth herein. Rather, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

Figure 1:
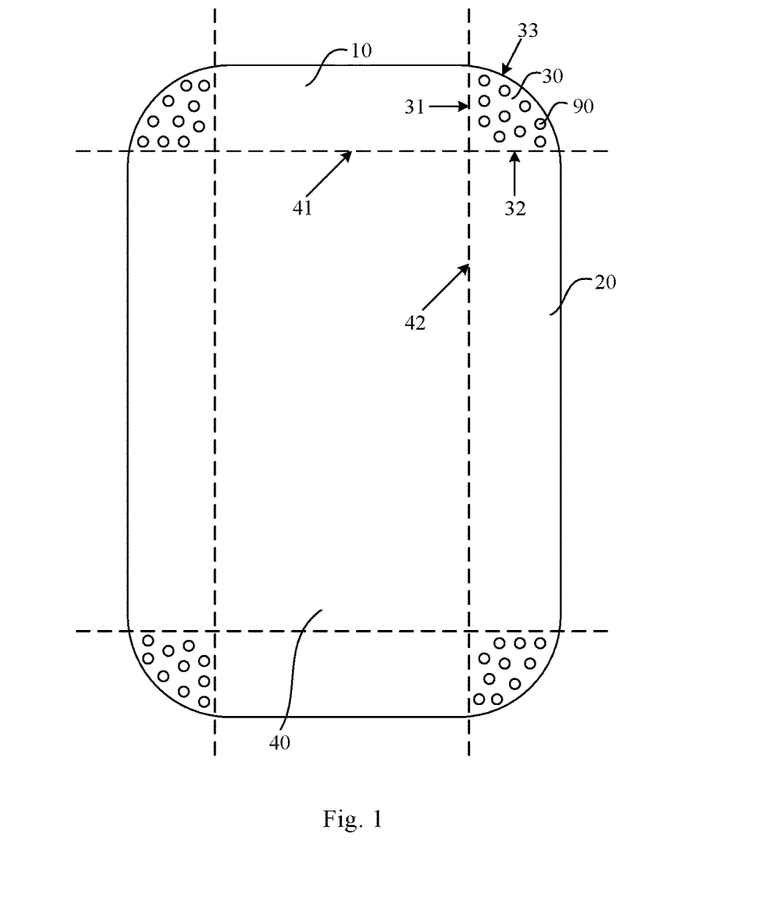
FIG. 1 is a schematic structural diagram of a back film according to an embodiment of the disclosure.

An embodiment of the present disclosure provides a back film for a curved display panel. As shown in FIG. 1, which is a schematic structural diagram of a back film in an embodiment, the back film includes a central area 40, and a first foldable area 10, a second foldable area 20 and a third foldable area 30 located around the central area 40. The central area 40 has a first edge 41 and a second edge 42 adjacent to each other. The first edge 41 extends in a first direction (horizontal direction), and the second edge 42 extends in a second direction (vertical direction). The first direction and the second direction intersects with each other. The first foldable area 10 is connected to the first edge 41 of the central area and extends along the first direction. The second foldable area 20 is connected to the second edge 42 of the central area and extends along the second direction. The third foldable area 30 is connected to a junction between the first edge 41 and the second edge 42 of the central area, and is further connected to the first foldable area 10 and the second foldable area 20. The third foldable area 30 is provided with a plurality of openings 90.

Figure 2:
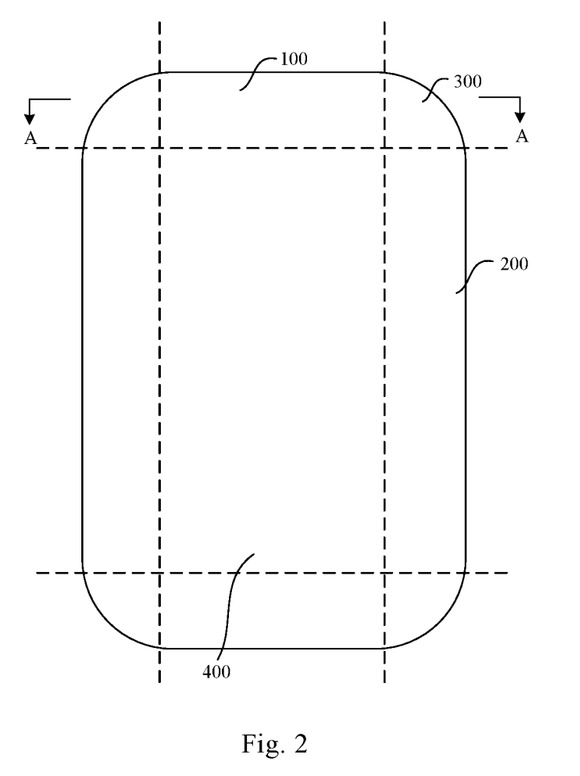
FIG. 2 is a schematic top view of a rectangular curved display panel according to an embodiment of the disclosure.
Figure 3:
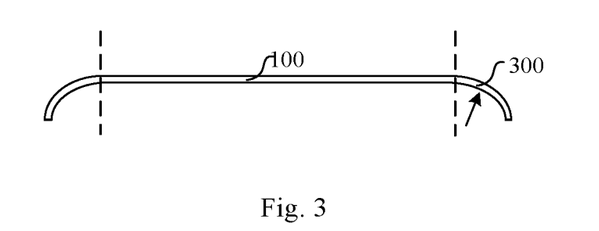
FIG. 3 shows a schematic cross-sectional view along the direction A-A of the curved display panel in FIG. 2.

The back film is suitable for a display panel with curved surfaces on both adjacent sides. Referring to FIG. 2 and FIG. 3, FIG. 2 shows a schematic top view of a curved display panel, and FIG. 3 shows a schematic cross-sectional view along the A-A direction of the curved display panel in FIG. 2. The curved display panel has a central area 400, a first curved area 100 and a second curved area 200 located on two adjacent sides of the central area 400 respectively, and a transition area 300 located at a corner of the central area 400 and connected to the first curved area 100 and the second curved area 200. Since the first curved surface area 100 and the second curved surface are both curved surfaces, the transition area 300 is also curved.

In FIG. 3, the upper surface of the display panel is the display surface, and the lower surface of the display panel is the back surface. When attaching the back film in an embodiment of the present disclosure, it is attached to the back surface, and the central area 40 of the back film covers the central area 400 of the curved display panel. The first foldable area 10 of the back film covers the first curved area 100 of the curved display panel. The second foldable area 20 of the back film covers the second curved area 200 of the curved display panel. The third foldable area 30 of the back film covers the transition area 300 of the curved display panel. Since both the first curved area 100 and the second curved area 200 are folded areas, the transition area 300 is also a folded area and folded in two directions at the same time.

Since the first foldable area 10 and the second foldable area 20 of the back film will be folded along with the curved surface of the curved display panel, the third foldable area 30 should be folded inward in two directions at the same time. The greater the folding stress at such position is, and the more likely the stress concentration is to occur. When the third foldable area 30 is folded, it is easy to produce wrinkles due to extrusion (at the position indicated by an arrow in FIG. 3), resulting in the problem of loose attachment. Besides, the closer it is to the central area 40, the more apparent the stress concentration is, which will cause the back film to be damaged. A plurality of openings 90 is arranged in the third foldable area. The openings 90 may disperse the folding stress here, improve the folding resistance of the back film, and further improve the ductility and adhesion tightness of the back film when it is attached, thereby avoiding damages to the back film here, and prolonging the service life of the back film. In the present disclosure, "a plurality of" refers to more than one, such as two, three, four or more, and the present disclosure does not specifically limit the specific number referred to by wording of "a plurality of".

It should be noted that the above four areas correspond to different parts of the back film, but the entire back film is an integral structure.

The curved display panel according to an embodiment of the present disclosure will be described in detail below.

FIG. 1 shows a schematic structural diagram of a back film. In the figure, four areas of the back film are separated by dotted lines. The central area 40 is rectangular and is located at the center of the back film. The first edge 41 and the second edge 42 may be any two adjacent edges of the central area 40. As an example, the upper edge of the central area is taken as the first edge 41 and the right edge of the central area is taken as the second edge 42 for illustration. The first edge 41 and the second edge 42 are perpendicular to each other. The part above the first edge 41 is the first foldable area 10, the part located on the right side of the second edge 42 is the second foldable area 20, and the part located at the upper right corner of the central area 40 and further between the first foldable area 10 and the second foldable area 20 is the third foldable area 30. It can be understood that when the first edge and the second edge are other edges, the first foldable area and the second foldable area may also be the areas located outside of any other adjacent two edges in the central area. Accordingly, the third foldable area may also be the area located at other corners of the central area.

In an exemplary embodiment, the shapes of the first foldable area 10 and the second foldable area 20 are both rectangles. The extension length of the first foldable area 10 in the first direction is equal to the length of the first edge 41 of the central area. The extension length of the second foldable area 20 in the second direction is equal to the length of the second edge 42 of the central area. The third foldable area 30 includes a first straight edge 31 connected to the first foldable area, a second straight edge 32 connected to the second foldable area, and an arc-shaped edge 33 connected to the first straight edge and the second straight edge. The length of the first straight edge 31 is equal to the width of the first foldable area 10 in the second direction. The length of the second straight edge 32 is equal to the width of the second foldable area 20 in the first direction. That is, the outermost edges of the three foldable areas form a smooth connection. As shown in FIG. 1, when the sizes of the four areas in each direction are matched, the entire back film is in a rectangular shape, which may be applied to a display panel with curved surfaces on all four sides.

It can be understood that, when the third foldable area 30 is only disposed at one corner of the central area, the back film is only suitable for a display panel with curved surfaces only on two sides. In a word, the corresponding back film structure may be set according to the specific shape of the applied curved display panel.

Figure 4:
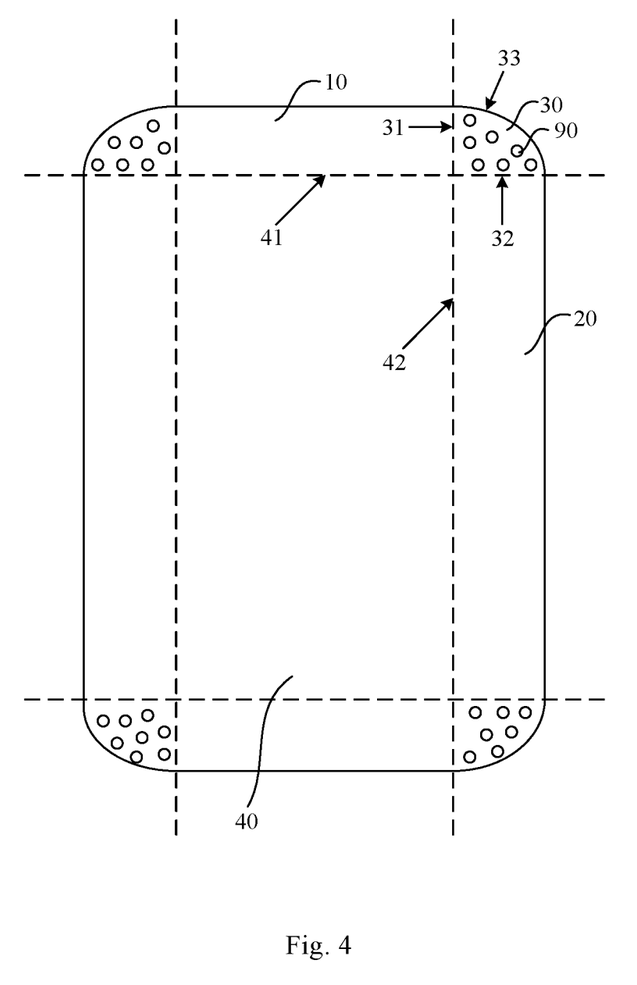
FIG. 4 is another schematic top view of a curved display panel according to an embodiment of the disclosure.

In an exemplary embodiment, as shown in FIG. 1, the lengths of the first straight edge 31 and the second straight edge 32 of the third foldable area 30 are equal. That is, the width of the first foldable area 10 in the second direction is equal to the width of the second foldable area 20 in the first direction. At this time, the third foldable area 30 is fan-shaped. The back film of this structure is suitable for most display panels with the same curvature of adjacent side surfaces. At the same time, since the lengths of the first straight edge 31 and the second straight edge 32 are equal, that is, the width of the first foldable area 10 in the second direction is equal to the length of the second foldable area, stress relief in two directions by the openings 90 in the third foldable area may also maintain uniform, thereby relieving the phenomenon of stress concentration to the greatest extent. Of course, in other embodiments, the lengths of the first straight edge 31 and the second straight edge 32 may also be unequal, and the corresponding widths of the first foldable area 10 and the second foldable area 20 are also not equal. As shown in FIG. 4, the length of the first straight edge 31 is smaller than the length of the second straight edge 32. The back film of this shape may also disperse the stress at the corner, and has good adhesion and folding resistance.

In an embodiment of the present disclosure, the shape of the opening 90 in the third foldable area may be any polygon, such as circle, ellipse, rectangle, oblong hole, arc, rhombus, straight line, curved line, or fold line.

Figure 5:
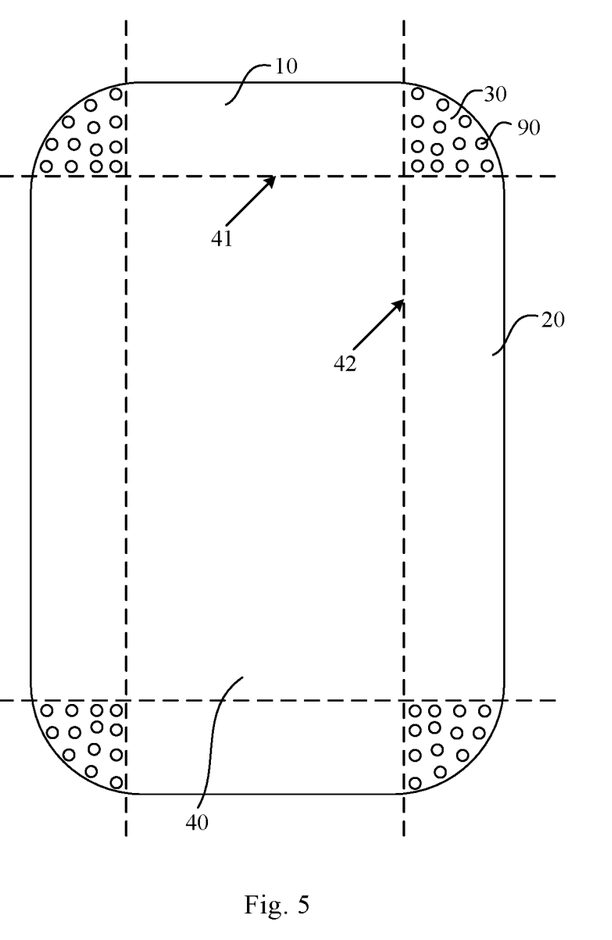
FIG. 5 is a first schematic diagram of openings in the third foldable area according to an embodiment of the disclosure.

In an exemplary embodiment, as shown in FIG. 5, the shape of the opening 90 in the third foldable area is a circle. The circular openings disperse the stress in all directions evenly and are easy to process. The plurality of circular openings may be arranged uniformly or non-uniformly. Since the third foldable area 30 is located between the two foldable areas and is folded in two directions at the same time, the size of each opening is different from that in the folding area along a single direction.

In an embodiment, the diameter of the circular opening is 3-10 μm, and the spacing between two adjacent circular openings is 10-15 μm. If the openings are too large and the spacing is too small, it will be easy to cause the strength of the back film to be poor. If the openings are too small and the spacing is too large, the stress dispersibility will deteriorate and the folding resistance will be reduced. The above-mentioned size range helps to make balance between the strength and the folding resistance of the back film. It should be noted that the spacing here may refer to the spacing between two circular openings adjacent to each other in any direction.

Further, since the stress concentration is more apparent if the third foldable area 30 becomes closer to the central area 40, the circular openings may be unevenly distributed. As shown in FIG. 5, the closer to the center area, the smaller the spacing between two adjacent circular openings, which helps to better relieve the internal stress.

Figure 6:
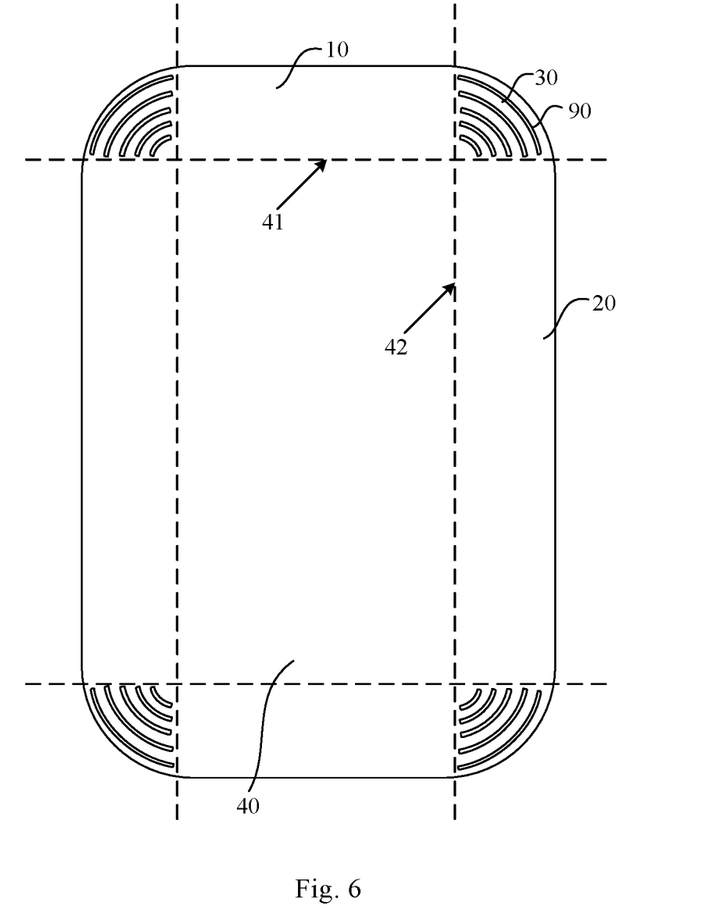
FIG. 6 is a second schematic diagram of openings in the third foldable area according to an embodiment of the disclosure.

In another exemplary embodiment, as shown in FIG. 6, each opening 90 in the third foldable area is arc-shaped, and the extension direction of the arc-shaped opening is the same as that of the arc-shaped edge 33 of the third foldable area 30. It should be noted that, the description about shape and extension direction of the arc-shaped opening here is directed to the overall shape of the opening 90. It is understood that the arc-shaped opening may further have a certain width. In an embodiment, one end of the arc-shaped opening extends to the first straight edge 31, and another end of the arc-shaped opening extends to the second straight edge 32. Extending to the first straight edge 31 or the second straight edge 32 may specifically mean overlapping with the first straight edge 31 or the second straight edge 32, or having a certain distance from the first straight edge 31 or the second straight edge 32. The arc-shaped openings are arranged at intervals along a direction from a corner of the central area to the arc-shaped edge 33. That is, the arc-shaped openings are arranged one by one at intervals from a corner of the central area to the outside. The opening 90 of such structure may continuously disperse the stress in two directions, and have a better effect of stress relief.

In an embodiment, the width of the arc-shaped opening is 80-120 μm, and the spacing between two adjacent arc-shaped openings is 150-250 μm. If the width of the arc-shaped opening is too large and the spacing is too small, the strength of the back film will be deteriorated easily. If the width is too small and the spacing is too large, the stress dispersion will be deteriorated, and the folding resistance will be reduced. The above mentioned size range may make balance between the strength and the folding resistance of the back film.

Further, since the stress concentration is more apparent when the third foldable area 30 becomes closer to the central area 40, the arc-shaped openings may be distributed at unequal intervals. As shown in FIG. 6, the closer to the corner of the center area, the smaller the spacing between two adjacent arc-shaped openings, which helps to better relieve the internal stress.

In some exemplary embodiments, the shape of each opening 90 in the third foldable area may also be a strip, and the strip opening extends in a direction from a corner of the central area 40 toward the arc-shaped edge 33. It can be understood that the strip opening further has a certain width. It should be noted that, the description about shape and extension direction of the strip opening here is directed to the overall shape of the opening 90, which means that the length of the entire opening in the extension direction is greater than the width of the opening. Specifically, the strip opening may be an opening of various shapes, such as straight line, curved line, and folded line.

Figure 7:
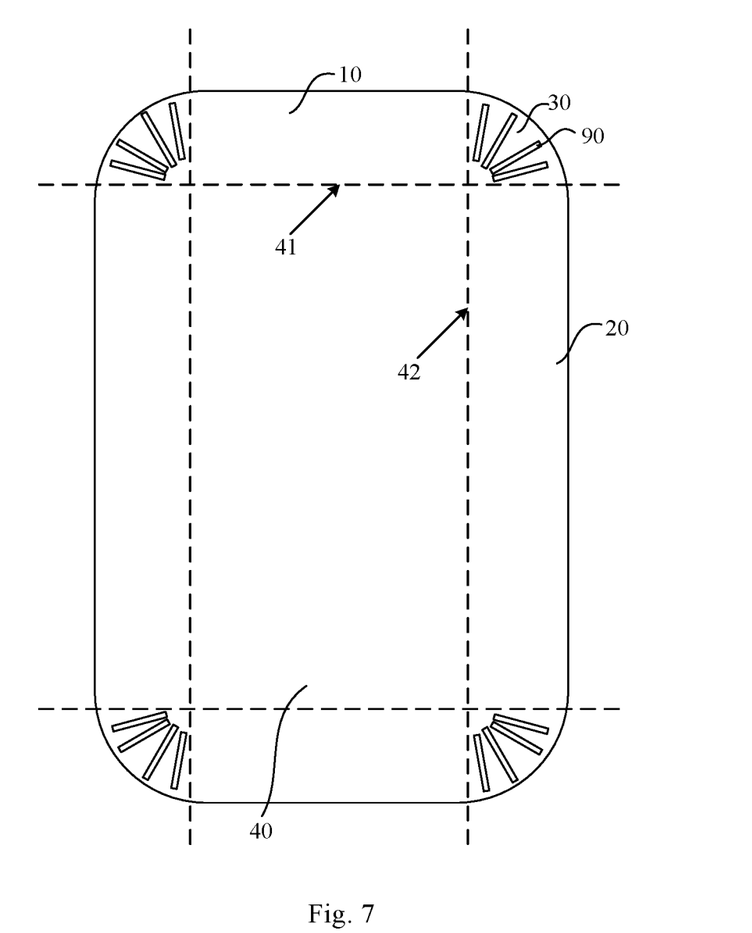
FIG. 7 is a third schematic diagram of openings in the third foldable area according to an embodiment of the disclosure.

In an exemplary embodiment, as shown in FIG. 7, the opening is linear, one end of the linear opening extends to a corner of the central area, and another end of the linear opening extends to the arc-shaped edge 33 of the third foldable area. Extending to a corner of the central area 40 or the arc-shaped edge 33 may specifically means overlapping with the corner of the central area or the arc-shaped edge 33, or having a certain distance from the corner of the central area or the arc-shaped edge 33. The linear openings are arranged at intervals along a direction from the first straight edge 31 to the second straight edge 32. The opening 90 of such structure may also continuously disperse the stress in two directions, which has a better effect of stress relief.

In an embodiment, the width of the linear opening is 80-120 μm, and the spacing between two adjacent linear openings is 150-250 μm. If the width of the linear opening 90 is too large and the spacing is too small, the strength of the back film will be deteriorated easily. If the width is too small and the spacing is too large, the stress dispersion will be deteriorated, and the folding resistance will be reduced. The above mentioned size range may make balance between the strength and the folding resistance of the back film.

Further, since the stress concentration is more apparent when the third foldable area 30 becomes closer to the central area 40, the linear openings may be distributed at unequal intervals. As shown in FIG. 7, the closer to the corner of the central area 40, the smaller the spacing between the two adjacent linear openings. That is, each linear opening is radial, which may better relieve the internal stress.

Figure 8:
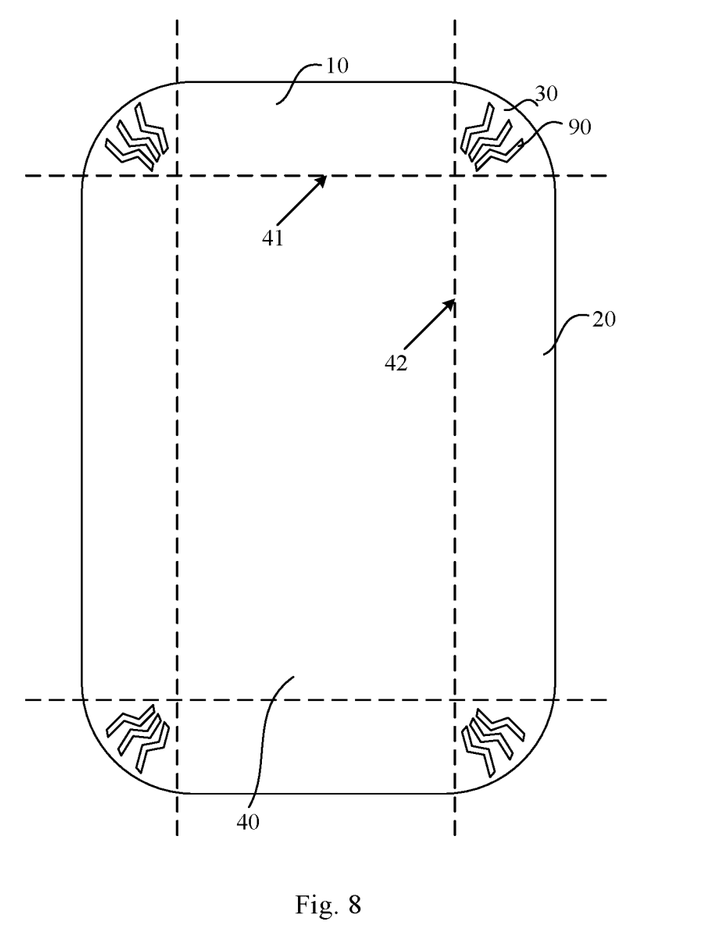
FIG. 8 is a fourth schematic diagram of openings in the third foldable area according to an embodiment of the disclosure.

In another exemplary embodiment, as shown in FIG. 8, the opening is in the shape of folded line. The opening in the shape of folded line is composed of three straight lines. One end of the opening in the shape of folded line extends to a corner of the central area, and another end of the opening in the shape of folded line extends to the arc-shaped edge 33 of the third foldable area. Extending to the corner of the central area or the arc-shaped edge 33 may specifically mean overlapping with the corner of the central area or the arc-shaped edge 33, or having a distance from the corner of the central area or the arc-shaped edge 33. The openings in the shape of folded line are arranged at intervals along a direction from the first straight edge 31 to the second straight edge 32. The opening 90 of such structure may also continuously disperse the stress in two directions, which has a better effect of stress relief. In other embodiments, the strip opening may also be an opening in the shape of folded line composed of other amounts of straight lines, which will not be listed one by one here. It should be noted that, angles between the straight lines forming the opening in the shape of folded line may be set as required, which is not specifically limited in the present disclosure.

In an embodiment, the width of the opening in the shape of folded line is 80-120 μm, and the spacing between two adjacent openings in the shape of folded line is 150-250 μm. If the width of the opening in the shape of folded line is too large and the spacing is too small, the strength of the back film will be deteriorated easily. If the width is too small and the spacing is too large, the stress dispersion will be deteriorated, and the folding resistance will be reduced. The above mentioned size range helps to make balance between the strength and the folding resistance of the back film.

Further, since the stress concentration is more apparent if the third foldable area 30 becomes closer to the central area 40, the openings in the shape of folded line may be distributed at unequal intervals. As shown in FIG. 8, the closer to the corner of the central area 40, the smaller the spacing between the two adjacent openings in the shape of folded line. That is to say, each opening in the shape of folded line is radial, which may better relieve the internal stress.

The above embodiments are all described by taking a rectangular back film suitable for a rectangular curved display panel as an example. In other embodiments, according to other shapes of curved display panels, the back film may not be rectangular. The first edge 41 and the second edge 42 may not be perpendicular to each other, and accordingly, the two straight edges of the third foldable area 30 are not perpendicular to each other either.

Figure 9:
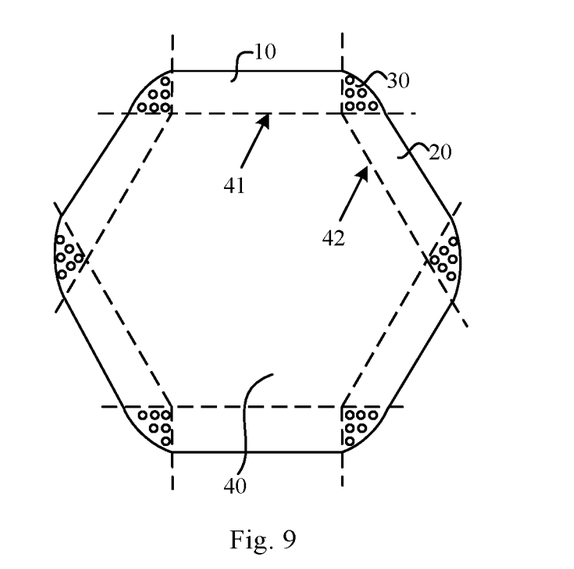
FIG. 9 is a schematic top view of a hexagonal curved display panel according to an embodiment of the disclosure.

FIG. 9 shows a back film for a hexagonal curved display panel. The six edges of the hexagonal curved display panel are all curved surfaces, and the six corners of the hexagonal curved display panel are also curved surfaces. The central area 40 of the back film corresponding to the display panel is hexagonal, and each corner includes the third foldable area 30. It may be seen in an embodiment that the first foldable area 10 and the second foldable area 20 may not be rectangular. Accordingly, the first straight edge 31 and the second straight edge 32 of the third foldable area may also be not perpendicular to each other, so that corners can also be formed for covering the curved display panel. Those skilled in the art can understand that the structure and principle of the back film are the same as the above embodiments, and details are not repeated here. Furthermore, in the above embodiment, the edge connecting the first straight edge 31 and the second straight edge 32 in the third foldable area is an arc-shaped edge, which is more suitable for the appearance of the transition area 300 of the curved display panel and provides better adhesion. In other embodiments, the edge may also be a straight line or a folded line, so that the third foldable area 30 is in the shape of right-angled triangle or rectangle, as long as it can be fit for the display panel. The specific shape is not detailed any more.

In an embodiment of the present disclosure, each of the first foldable area and the second foldable area of the back film may also be provided with a plurality of openings, so that the first foldable area and the second foldable area also have a better effect of stress dispersion. Specifically, the opening of the first foldable area and the second foldable area may be in various shapes, such as circle, strip, and the like. Shape and distribution of the openings in the two areas may be the same or different. Of course, shapes of the openings 90 in the two areas may also be the same as or different from shape of the openings 90 in the third foldable area.

It should be noted that the openings 90 in the third foldable area of the back film in an embodiment of the present disclosure may be through holes penetrating through the entire back film, or may be blind holes that do not penetrate through the back film. On the other hand, the back film in an embodiment of the present disclosure may be a single-layer film or a multi-layer film. For example, it may include a main body layer of the back film and a protective layer covering one side of the main body layer, and may even include a release layer disposed on the other side of the main body layer. The release layer on one side may be peeled off when the back film needs to be attached. Then, when the opening 90 is a through hole, the through hole penetrates through all the film layers. When the opening 90 is a blind hole, it may only penetrate through part of the film layers or part of the thickness of one film layer.

Figure 10:
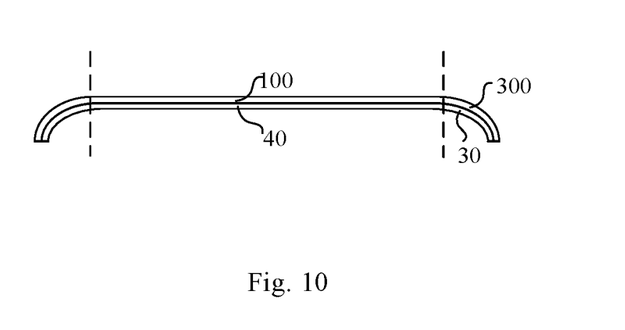
FIG. 10 is a structural cross-sectional view of a display device according to an embodiment of the disclosure.

Embodiments of the present disclosure further provide a display device. The display device includes a curved display panel and a back film. Referring to the shapes of the display panel and the back film shown in FIG. 2 and FIG. 3, the curved display panel has a central area 400, a first curved area 100 and a second curved area 200 respectively located on the two adjacent sides of the center area, and a transition area 300 located at a corner of the central area and connected with the first curved area 100 and the second curved area 200. The back film is attached onto the back side of the curved display panel, and the central area 40 of the back film covers the central area 400 of the curved display panel. The first foldable area 10 of the back film covers the first curved area 100 of the curved display panel. The second foldable area 20 of the back film covers the second curved area 200 of the curved display panel. The third foldable area 30 of the back film covers the transition area 300 of the curved display panel. The structural cross-sectional view of the display device is shown in FIG. 10. Only the display panel and the back film are shown in FIG. 10. Those skilled in the art know that other auxiliary structural layers such as support layer may usually be provided on the back side of the display panel. In this structure, the back film may also be provided on the back side of all the auxiliary structural layers. The structure, shape, etc. of the back film are the same as those in embodiments of the present disclosure, and are not repeated here.

In an exemplary embodiment shown by FIG. 2, the shape of the central area 400 of the curved display panel is a rectangle, the number of the transition areas 300 is four, and the transition areas 300 are located at four corners of the central area 400 respectively. The central area 40 of the back film is rectangular in shape, the number of the third foldable areas 30 is four, and the third foldable areas 30 are located at four corners of the central area 40 respectively. Each of the four third foldable areas 30 of the back film covers a respective one of the four transition areas 300 of the curved display panel. In an embodiment shown by FIG. 9, the curved display panel may also be hexagonal, and the corresponding back film is also hexagonal. The specific structure is similar to that of a rectangle case, which will not be repeated here.

The present invention does not specifically limit the application of display devices, which may be any products or components with the display function, such as tablet computer, mobile phone, e-book, digital photo frame, etc. The back film as mentioned above may be provided in these display devices for protecting the curved display panel.

Although relative terms such as "upper" and "lower" are used in the present specification to describe the relative relationship of one component represented by an icon to another component, these terms are used in the present specification only for convenience, such as according to the direction shown in the example described. It will be appreciated that if the device represented by the icon is turned upside down, the components described as being located "on" the device will become the components being located "under" the device. When a certain structure is located "on" another structure, it may mean that the certain structure is integrally formed on the other structure, or that the certain structure is "directly" arranged on the other structure, or that the certain structure is "indirectly" arranged on the other structure through a third structure.

The terms such as "a", "an", "the", "said" and "at least one" are used to indicate the presence of one or more elements or components, etc. The terms such as "include" and "have" are used to indicate an open-ended inclusion, which means that additional elements or components, etc. may be present in addition to the listed elements or components, etc.

Other embodiments of the present disclosure will readily occur to those skilled in the art upon consideration of the present specification and practice of the content disclosed herein. The present disclosure is intended to cover any variations, uses, or adaptations of the present disclosure that follow the general principle of the present disclosure and include common general knowledge or techniques in the technical field not disclosed by the present disclosure. The specification and examples are to be regarded as exemplary only, with the true scope and spirit of the present disclosure being indicated by the appended claims.

The invention claimed is:

1. A back film for a curved display panel, wherein the back film comprises: a central area, having a first edge and a second edge adjacent to the first edge, wherein the first edge extends in a first direction, the second edge extends in a second direction, and the first direction intersects with the second direction; a first foldable area, connected to the first edge of the central area and extending in the first direction; a second foldable area, connected to the second edge of the central area and extending in the second direction; and a third foldable area, connected to a junction between the first edge and the second edge of the central area, and connected further to the first foldable area and the second foldable area, wherein the third foldable area is provided with a plurality of openings, and wherein the first foldable area and the second foldable area are each provided with a plurality of openings, wherein the first edge and the second edge are perpendicular to each other, the first foldable area and the second foldable area are both rectangular in shape, an extension length of the first foldable area in the first direction is equal to a length of the first edge of the central area, and an extension length of the second foldable area in the second direction is equal to a length of the second edge of the central area; and the third foldable area comprises a first straight edge connected to the first foldable area, a second straight edge connected to the second foldable area, and an arc-shaped edge connected to the first straight edge and the second straight edge, wherein a length of the first straight edge is equal to a width of the first foldable area in the second direction, and a length of the second straight edge is equal to a width of the second foldable area in the first direction, wherein lengths of the first straight edge and the second straight edge are equal, and the third foldable area is in a fan shape, and wherein each opening of the third foldable area is arc-shaped, and an extension direction of each arc-shaped opening is the same as an extension direction of the arc-shaped edge of the third foldable area; a first end of each arc-shaped opening extends to the first straight edge, and a second end of each arc-shaped opening extends to the second straight edge; and the arc-shaped openings are arranged at intervals in a direction from a corner of the central area towards the arc-shaped edge.

2. The back film according to claim 1, wherein a width of each arc-shaped opening is 80-120 μm, and a distance between two adjacent arc-shaped openings is 150-250 μm.

3. The back film according to claim 1, wherein a spacing between adjacent openings of the third foldable area gradually decreases in a direction towards the central area.

4. The back film according to claim 1, wherein the central area is rectangular in shape, a number of the third foldable areas is four, and the third foldable areas are respectively located at four corners of the central area.

5. The back film according to claim 1, wherein each opening of the first foldable area and the second foldable area is in a circle or strip shape.

6. The back film according to claim 1, wherein
shape and distribution of the openings in the first foldable area are the same as or different from shape and distribution of the openings in the second foldable area; and
shapes and distributions of the openings in the first foldable area and of the openings in the second foldable area are the same as or different from shape and distribution of the openings in the third foldable area.

7. The back film according to claim 1, wherein each opening of the third foldable area is a through hole penetrating through the back film or a blind hole not penetrating through the back film.

8. The back film according to claim 1, wherein the back film is a single-layer film or a multi-layer film.

9. A display device, comprising:
a curved display panel, having a central area, a first curved area and a second curved area respectively located at two adjacent sides of the central area, and a transition area located at a corner of the central area and connected to the first curved area and the second curved area; and
a back film, disposed on a back side of the curved display panel, wherein the back film comprises:
a central area, having a first edge and a second edge adjacent to the first edge, wherein the first edge extends in a first direction, the second edge extends in a second direction, and the first direction intersects with the second direction;
a first foldable area, connected to the first edge of the central area and extending in the first direction;
a second foldable area, connected to the second edge of the central area and extending in the second direction; and
a third foldable area, connected to a junction between the first edge and the second edge of the central area, and connected further to the first foldable area and the second foldable area, the third foldable area comprises a first straight edge connected to the first foldable area, a second straight edge connected to the second foldable area, and an arc-shaped edge connected to the first straight edge and the second straight edge,
wherein a length of the first straight edge is equal to a width of the first foldable area in the second direction, and a length of the second straight edge is equal to a width of the second foldable area in the first direction,
wherein lengths of the first straight edge and the second straight edge are equal, and the third foldable area is in a fan shape,
wherein the central area of the back film covers the central area of the curved display panel, the first foldable area of the back film covers the first curved area of the curved display panel, the second foldable area of the back film covers the second curved area of the curved display panel, and the third foldable area of the back film covers the transition area of the curved display panel,
wherein the third foldable area is provided with a plurality of openings, and
wherein the first foldable area and the second foldable area are each provided with a plurality of openings, and
wherein each opening of the third foldable area is arc-shaped, and an extension direction of each arc-shaped opening is the same as an extension direction of the arc-shaped edge of the third foldable area;
a first end of each arc-shaped opening extends to the first straight edge, and a second end of each arc-shaped opening extends to the second straight edge; and the arc-shaped openings are arranged at intervals in a direction from a corner of the central area towards the arc-shaped edge.

10. The display device according to claim 9, wherein
the central area of the curved display panel is rectangular in shape, a number of the transition areas is four, and the transition areas are respectively located at four corners of the central area of the curved display panel;
the central area of the back film is rectangular in shape, a number of the third foldable areas is four, and the third foldable areas are respectively located at four corners of the central area of the back film; and
each of the third foldable areas of the back film covers a respective transition area of the transition areas of the curved display panel.

* * * * *